Patented Aug. 23, 1932

1,873,689

UNITED STATES PATENT OFFICE

JAMES F. WALSH, OF EAST ORANGE, AND AMERIGO F. CAPRIO, OF NEWARK, NEW JERSEY, ASSIGNORS TO CELLULOID CORPORATION, A CORPORATION OF NEW JERSEY

COMPOSITION CONTAINING CELLULOSE DERIVATIVES AND PROCESS OF MAKING THE SAME

No Drawing.    Application filed March 23, 1928. Serial No. 264,271.

This invention relates to the preparation of plastic masses, solutions, films, yarns, rods, tubes and the like made of or containing derivatives of cellulose, and relates more particularly to the preparation of these substances by the use of vinyl compounds.

An object of our invention is to provide a solvent for cellulose derivatives that is in many respects superior to previously known solvents.

Another object of our invention is to use vinyl compounds in the preparation of solutions or plastic masses containing derivatives of cellulose. Other objects of our invention will appear from the following detailed description.

Although unpolymerized vinyl compounds alone are not solvents for all derivatives of cellulose, we have found that mixtures of vinyl compounds with other liquids which of themselves may or may not be solvents for cellulose derivatives, form excellent solvents for cellulose derivatives, and that solutions or plastic masses containing such vinyl compounds are superior in many respects, both as to ease of working and properties of products formed, to solution or plastic masses not containing the same. We have found that while, for example, vinyl acetate dissolves cellulose nitrate readily in the cold without the assistance of other liquids, it merely gels and slowly dissolves benzyl cellulose or ethyl cellulose, while it does not dissolve cellulose acetate at all without the presence of another liquid that acts as a solvent assistant.

In accordance with our invention, we prepare solutions of plastic masses containing derivatives of cellulose, vinyl compounds and auxiliary solvents which may be low boiling liquids, and/or medium boiling liquids, and/or high boiling liquids, and/or plastifiers or softeners.

The derivatives of cellulose that are to be used may be of any suitable nature, such as cellulose esters or cellulose ethers. Examples of cellulose esters are cellulose nitrate but we prefer to use the organic esters of cellulose such as cellulose acetate, cellulose propionate and celluose formate, cellulose propionate and celluose butyrate. Examples of cellulose ethers that may be used are methyl cellulose, ethyl cellulose and benzyl cellulose. Any of the above mentioned cellulose derivatives may be used, or a mixture of two or more of these may be employed. However, we prefer to use the organic derivatives of cellulose and particularly cellulose acetate in our process.

Any suitable vinyl compound, that is, a compound having the group $CH_2=CH$ therein, may be used in our invention. Since the vinyl compound is used as a solvent or rather as a solvent assistant, it should not be in a solid or semi solid state and therefore should be in the substantially unpolymerized or only slightly polymerized form. Of the vinyl compounds that may be used, we prefer the vinyl acetate, but it is to be understood that other vinyl compounds such as the compound formed by dehalogenating a vinyl halide (say vinyl chloride) by means of zinc dust, vinyl propionate, vinyl phosphate, vinyl phthalate, styrene ($C_6H_5CH=CH_2$), which is vinyl benzene, or its compounds, etc. may be used. The use of the vinyl compounds that are gaseous at ordinary temperatures (18° to 21° C.), such as vinyl chloride or vinyl bromide is not excluded, since solutions of these compounds in ethyl alcohol or other solvents may be used.

As stated above, the substantially unpolymerized vinyl compounds alone are not solvents for some cellulose derivatives, but with certain organic liquids, form mixtures that are solvents for cellulose derivatives. These organic liquids may or may not be solvents for the cellulose derivatives. Thus, for example, while neither substantially unpolymerized vinyl acetate nor ethyl alcohol are solvents for cellulose acetate when used alone, a mixture of the two, say 50 to 60 parts of vinyl acetate and 50 to 40 parts of alcohol, readily dissolve cellulose acetate when warmed to 40° to 60° C.

As stated before, the auxiliary solvents for the vinyl compounds may be low boiling liquids, medium boiling liquids, high boiling liquids or plastifiers. One, two or more materials of one, two or more of these groups of substances may be used.

Examples of low boiling solvents or solvent assistants that may be used in conjunction with the vinyl compounds are alcohol, (ethyl, methyl or denatured), acetone, benzene, methylene dichloride, chloroform or a mixture of two or more of these liquids.

Examples of medium and/or high boiling solvent that may be used are ethyl acetate, amyl acetate, butyl acetate, ethyl lactate, toluene, ethylene dichloride, tetrachlorethane, butyl alcohol, benzyl alcohol, diacetone alcohol, methyl oxybutyrate, methyl ether of ethylene glycol or a mixture of two or more of these liquids.

Examples of plastifiers, softeners, or camphor substitutes, and fire retardants are triphenyl phosphate, tricresyl phosphate, diethyl phthalate, dibutyl tartrate, amides or sulfonamides such as mono methyl toluene sulfonamid, triacetin, thiocarbanilid, etc.

As to the specific proportions of the substances that are to be used in making up the solutions or plastic masses containing the derivatives of cellulose and vinyl compounds, these may be varied within very wide limits depending on the nature of the composition and use to which it is to be put. Obviously the proportions of volatile liquids to be used will be comparatively large for the making of solutions to be used as lacquers or for the preparation of films, yarns and the like; while the proportion of volatile liquids will be small in the case of plastic masses for the making of sheets, tubes, rods and the like.

Further to explain our invention and without limiting ourselves thereto, the following specific examples are given.

*Example I*

A liquid solution is made up as follows:

| | Parts |
|---|---|
| Cellulose acetate | 100 |
| Alcohol (ethyl or denatured) | 100 to 400 |
| Vinyl acetate | 125 to 400 |
| Plastifier or softener | 10 to 100 |

The plastifier may be triphenyl phosphate or any other suitable softener or plastifier mentioned above. The above described solution may be used for making films or yarns in the usual manner. If it is to be used as a lacquer, it is preferable to add some medium and/or high boiling solvent and also some resins or gums, such as ester gum (glycerol ester of rosin), dammar, etc., although it is to be understood that the use of these substances is not absolutely necessary.

*Example II*

The following is an example of a plastic mass containing cellulose acetate and vinyl acetate.

| | Parts |
|---|---|
| Cellulose acetate | 100 |
| Vinyl aceate | 25 to 75 |
| Alcohol (ethyl or denatured) | 25 to 75 |
| Plastifier or softener | 25 to 80 |

The plastifier or softener may be triphenyl phosphate, or any other suitable softener or plastifier mentioned above. The alcohol may be replaced in whole or in part by any suitable high, medium or low boiling solvent described above. Gums, resins and other material may be added to the plastic mass if desired. The plastic mass may be worked up by thorough kneading and then on malaxating rolls in the ordinary manner. The sheets thus formed may be blocked, sheeted, cured, and converted into desired articles of commerce in the ordinary manner.

Filling materials, effect materials, pigments, dyes, stabilizers and anti acids such as urea, calcium lactate, etc. may be added to both the solutions and the plastic masses in any desired amounts as is well understood in the art.

It is to be understood that the foregoing details are given merely by way of illustration and that many variations may be made therein without departing from the spirit of this invention.

Having described our invention what we claim and desire to secure by Letters Patent is:

1. In the method of making solutions, plastic masses, films, yarns and other articles, the step of forming a solution of a derivative of cellulose in a solvent mixture comprising a substantially unpolymerized vinyl compound and an auxiliary organic liquid.

2. In the method of making solutions, plastic masses, films, yarns and other articles, the step of forming a solution of a cellulose ester in a solvent mixture comprising a substantially unpolymerized vinyl compound and an auxiliary organic liquid.

3. In the method of making solutions, plastic masses, films, yarns and other articles, the step of forming a solution of cellulose acetate in a solvent mixture comprising a substantially unpolymerized vinyl compound and an auxiliary organic liquid.

4. In the method of making solutions, plastic masses, films, yarns and other articles, the step of forming a solution of a derivative of cellulose in a solvent mixture comprising substantially unpolymerized vinyl acetate and an auxiliary organic liquid.

5. In the method of making solutions, plastic masses, films, yarns and other articles, the step of forming a solution of cellulose acetate in a solvent mixture comprising substantially unpolymerized vinyl acetate and an auxiliary organic liquid.

6. In the method of forming solutions, plastic masses, films, yarns or other articles, the step of dissolving at elevated temperatures a derivative of cellulose in a solvent mixture comprising substantially unpolymerized vinyl acetate and alcohol.

7. In the method of forming solutions, plastic masses, films, yarns or other articles, the step of dissolving at elevated temperatures cellulose acetate in a solvent mixture comprising substantially unpolymerized vinyl acetate and alcohol.

8. In the method of forming solutions, plastic masses, films, yarns or other articles, the step of dissolving at elevated temperatures a derivative of cellulose in a solvent mixture comprising substantially equal proportions of substantially unpolymerized vinyl acetate and alcohol.

9. A composition containing a derivative of cellulose dissolved in a solvent mixture comprising a substantially unpolymerized vinyl compound and an auxiliary organic liquid.

10. A composition containing cellulose acetate dissolved in a solvent mixture comprising a substantially unpolymerized vinyl compound and an auxiliary organic liquid.

11. A composition containing a cellulose derivative dissolved in a solvent mixture, comprising a substantially unpolymerized vinyl acetate and an auxiliary organic liquid.

12. A composition containing cellulose acetate dissolved in a solvent mixture comprising a substantially unpolymerized vinyl acetate and an auxiliary organic liquid.

13. A composition containing cellulose acetate dissolved in a solvent mixture comprising a substantially unpolymerized vinyl acetate and alcohol.

14. A composition containing cellulose acetate dissolved in a solvent mixture comprising a substantially unpolymerized vinyl acetate, alcohol and a plastifier.

15. A composition containing a cellulose derivative dissolved in a solvent mixture comprising substantially equal proportions of a substantially unpolymerized vinyl compound and alcohol.

16. A composition containing cellulose acetate dissolved in a solvent mixture comprising substantially equal proportions of substantially unpolymerized vinyl compound and alcohol.

17. A composition containing cellulose acetate dissolved in a solvent mixture comprising substantially equal proportions of substantially unpolymerized vinyl acetate and alcohol.

18. A composition containing substantially 100 parts of cellulose acetate and substantially 25 to 400 parts of vinyl acetate and 25 to 400 parts of ethyl alcohol.

In testimony whereof, we have hereunto subscribed our names.

JAMES F. WALSH.
AMERIGO F. CAPRIO.